United States Patent
Bhalerao et al.

(10) Patent No.: US 9,235,470 B2
(45) Date of Patent: Jan. 12, 2016

(54) ADAPTIVE EPWR (ENHANCED POST WRITE READ) SCHEDULING

(71) Applicants: Abhijeet Bhalerao, San Jose, CA (US);
Mrinal Kochar, San Jose, CA (US);
Piyush Sagdeo, San Jose, CA (US)

(72) Inventors: Abhijeet Bhalerao, San Jose, CA (US);
Mrinal Kochar, San Jose, CA (US);
Piyush Sagdeo, San Jose, CA (US)

(73) Assignee: SanDisk Technologies, Inc., Plano, TX (US)

( * ) Notice: Subject to any disclaimer, the term of this patent is extended or adjusted under 35 U.S.C. 154(b) by 246 days.

(21) Appl. No.: 14/045,294

(22) Filed: Oct. 3, 2013

(65) Prior Publication Data

US 2015/0100851 A1    Apr. 9, 2015

(51) Int. Cl.

| | |
|---|---|
| *G06F 11/00* | (2006.01) |
| *G11C 29/00* | (2006.01) |
| *G06F 11/10* | (2006.01) |
| *G06F 12/02* | (2006.01) |
| *G06F 11/07* | (2006.01) |

(52) U.S. Cl.
CPC ........ *G06F 11/1068* (2013.01); *G06F 12/0246* (2013.01); *G06F 11/0796* (2013.01)

(58) Field of Classification Search
CPC ............ G06F 11/1068; G06F 12/0246; G06F 11/0796; G11C 15/046; G11C 29/56008; G11C 7/1042

USPC .......... 714/773, 704, 701; 711/102, 104, 107; 365/189.011, 189.2

See application file for complete search history.

(56) References Cited

U.S. PATENT DOCUMENTS

| | | | |
|---|---|---|---|
| 8,423,866 B2 * | 4/2013 | Dusija ................ | G11C 11/5621 711/103 |
| 8,566,671 B1 * | 10/2013 | Ye ....................... | G06F 11/1048 714/764 |
| 8,713,408 B2 * | 4/2014 | Lee ..................... | G06F 11/1048 714/768 |
| 2009/0161430 A1 | 6/2009 | Allen et al. | |
| 2009/0222617 A1 | 9/2009 | Yano et al. | |
| 2010/0174845 A1 | 7/2010 | Gorobets et al. | |
| 2013/0028021 A1 | 1/2013 | Sharon et al. | |
| 2013/0031429 A1 | 1/2013 | Sharon et al. | |
| 2013/0031430 A1 | 1/2013 | Sharon | |
| 2014/0281316 A1 * | 9/2014 | Sano ................... | G06F 11/1451 711/162 |

FOREIGN PATENT DOCUMENTS

| | | |
|---|---|---|
| JP | 2009301264 | 12/2009 |
| WO | WO 0049488 | 8/2000 |

* cited by examiner

*Primary Examiner* — Christine Tu
(74) *Attorney, Agent, or Firm* — Brinks Gilson & Lione (57) ABSTRACT

A system and method for adaptive enhanced post write reads (EPWRs) is provided. An error rate of a block of solid state memory may be determined. Foldings may be performed more times between two consecutive enhanced post write reads on the block when the determined error rate of the block is a lower value than when the determined error rate is a higher value. The foldings may be performed by folding data into the block of the solid state memory.

20 Claims, 5 Drawing Sheets

ADAPTIVE EPWR (ENHANCED POST WRITE READ) SCHEDULING

BACKGROUND

1. Technical Field

This application relates to solid state memory and, in particular, to Enhanced Post Write Reads (EPWRs) performed on solid state memory.

2. Related Art

Solid state memory may have individually erasable segments, such as pages or blocks. Each of the erasable segments may be put through a limited number of erase cycles before becoming unreliable. Wear leveling attempts to address the limitation on the number of erase cycles by arranging data so that erasures and re-writes are distributed substantially even across the memory.

SUMMARY

An adaptive enhanced post write read (EPWR) system may be provided. The system may include a solid state memory, a folding module, an enhanced post write read module, and an enhanced post write read scheduler. The folding module may fold data into a block of the solid state memory. The enhanced post write read module may perform enhanced post write reads including a first enhanced post write read on the block and a second enhanced post write read on the block. The enhanced post write read scheduler may cause the enhanced post write read module to perform the second enhanced post write read on the block in response to a determination that data was folded into the block a determined number of times since the first enhanced post write read was performed on the block, where the determined number of times is based on a determined error rate of the block.

A non-transitory computer readable storage medium may also be provided that includes computer executable instructions, which are executable by a processor. The computer executable instructions may include instructions executable with the processor to perform enhanced post write reads including a first enhanced post write read on a block of solid state memory and a second enhanced post write read on the block of solid state memory. In addition, the computer executable instructions may include instructions executable with the processor to cause the second enhanced post write read to be performed on the block in response to a determination that data was folded into the block a determined number of times since the first enhanced post write read was performed on the block, where the determined number of times is based on a determined error rate of the block.

A method for adaptive enhanced post write reads (EPWRs) may be provided. An error rate of a block of a solid state memory may be determined. Foldings may be performed more times between two consecutive enhanced post write reads on the block when the determined error rate of the block is a first value than when the determined error rate is a second value, where the second value is higher than the first value. The foldings may be performed by folding data into the block of the solid state memory.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a method for adaptive enhanced post write reads (EPWRs) may be provided. An error rate of a block of a solid state memory may be determined. For example, the error rate of the block may be a fail bit count. The fail bit count may be a number of bits that differ between data written to the block and data subsequently read from the block. In the method, foldings may be performed more times between two consecutive enhanced post write reads on the block when the determined error rate of the block is a first value than when the determined error rate is a second value, where the first value is lower than the second value.

Each of the two consecutive enhanced post write reads may be any operation that reads data from the block after data was written to block in order to verify that the data was correctly written to the block. The foldings may be performed by folding data into the block of the solid state memory, such as when data is moved from one or more source blocks of the solid state memory to the block subject to the foldings. For example, a folding may be performed when data is moved from multiple blocks of a single-level cell flash memory to a block of multi-level cell flash memory in response to a garbage collecting event.

One technical advantage of the systems and methods described below is that enhanced post write reads may be performed less frequently than in a system in which an EPWR is performed after each folding. Each of the EPWRs adds overhead, such as 60 milliseconds for each EPWR. By limiting the number of EPWRs performed in an adaptive EPWRs system or method, overhead may be reduced. Another technical advantage of the systems and methods described below is that actual errors in the memory may be caught by the EPWRs that are performed.

Yet another technical advantage of the systems and methods described below is that the frequency at which EPWRs are performed may correspond to the actual determined error rate of the block. Accordingly, system performance may be improved without impacting reliability.

Still another technical advantage of the system may be that the system may be implemented on some existing storage devices by updating firmware in the existing storage devices. A new storage device may not necessarily be needed in order to implement the system.

Figure 1:
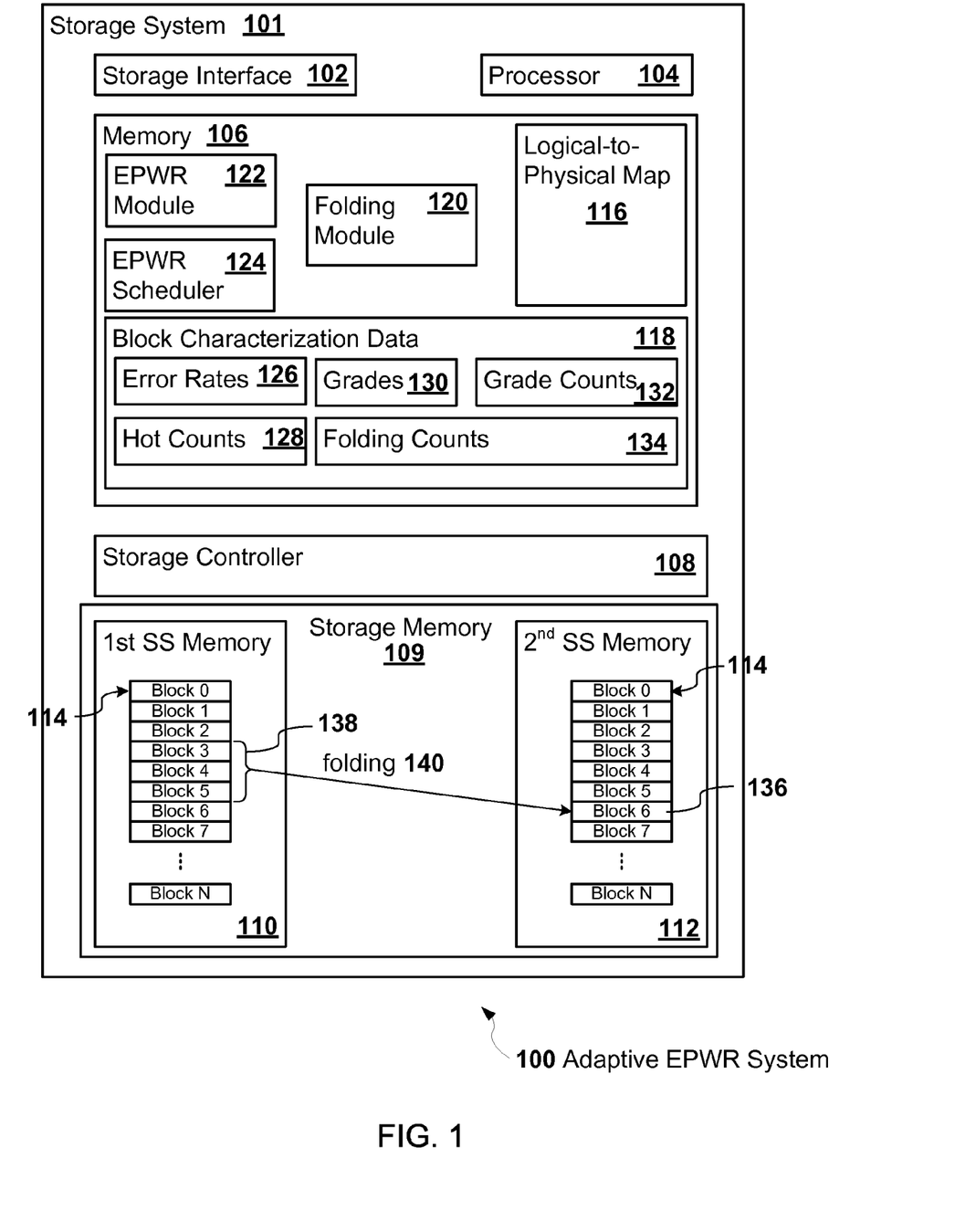
FIG. 1 illustrates an example of an adaptive enhanced post write read (EPWR) system.

FIG. 1 illustrates an example of an adaptive enhanced post write read (EPWR) system 100 that includes a storage system 101. The storage system 101 may include a storage interface 102, a processor 104, a memory 106, a storage controller 108, and storage memory 109, such as a first solid state memory 110 and a second solid state memory 112.

The storage system 101 may be device or combination of devices that stores data in the storage memory 109. For example, the storage system 101 may be a block device that comprises a device or combination of devices providing block level access to the data. A block device provides block level access by reading and writing data in the form of logical data blocks (LDAs). Examples of the storage system 101 include a flash drive, a solid state drive, a hard drive, a storage area network (SAN), or any other read/writeable computer-readable storage medium that includes solid state memory.

The storage system 101 may be in different forms, for example in the form of a portable memory card that may be carried between host devices or, for example, as a solid state disk (SSD) embedded in a host system (not shown). Alternatively, the storage system 101 may be a discrete storage device physically separate from the host system even when the storage system 101 is in communication with the host system.

The storage interface 102 may be any hardware based component configured to communicate data to and/or from the host system. The storage interface 102 may be a Serial Advanced Technology Attachment (also known as Serial ATA or SATA) interface, a SCSI (Small Computer System Interface) interface, a Universal Serial Bus (USB) circuit, an Ethernet interface or any other type of physical interface over which storage systems send and/or receive data.

The storage controller 108 may be any hardware based component that translates logical addresses, such as logical block addresses (LBAs), which are received from the host system, into appropriate signaling to access corresponding physical locations, such as blocks 114 or subsets of the blocks 114, in the storage memory 109. Examples of the storage controller 108 may include a memory controller, a NAND controller, a NOR controller, a disk controller, a SCSI (Small Computer System Interface) controller, a Fibre Channel controller, an INFINIBAND® controller (INFINIBAND is a registered trademark of System I/O, Inc. of Beaverton, Oreg.), a Serial Attached SCSI controller, a PATA (IDE) controller, and a Serial ATA controller.

The storage memory 109 may be any memory that includes solid state memory for persistent storage of host data. Solid state memory may be any memory that uses integrated circuit assemblies as memory. The storage memory 109 may include the first solid state memory 110 and/or the second solid state memory 110. Examples of the storage memory 109 may include NAND type flash memory, NOR type flash memory, static random access memory (SRAM), dynamic random access memory (DRAM) memory, electrically erasable programmable read-only memory (EEPROM), or any other type of solid state memory.

The first solid state memory 110 may have a different storage density than the second solid state memory 110. For example, the first solid state memory 110 may be a single level cell (SLC) flash memory, and the second solid state memory 112 may be a multi-level cell (MLC) flash memory. Alternatively, the first solid state memory 110 may have the same storage density as the second solid state memory 110.

In addition to the storage memory 109, the storage system 101 may include the memory 106 that includes a logical-to-physical map 116 and/or block characterization data 118. The memory 106 may include modules, such as a folding module 120, an enhanced post write read (EPWR) module 122, and an enhanced post write read (EPWR) scheduler 124.

The logical-to-physical map 116 may be a data structure, such as a table, and/or a module, such as a lookup module, that determines and/or stores a mapping between logical addresses and physical locations in the storage memory 109. For example, the logical-to-physical map 116 may include a mapping between logical data blocks in a file system and the blocks 114 or subsets of the blocks 114 of the storage memory 109.

The block characterization data 118 may be data that characterizes the blocks 114 that are in the storage memory 109. For example, the block characterization data 118 may include error rates 126, hot counts 128, grades 130, grade counts 132, and folding counts 134.

The folding module 120 may be any component that folds data into a target block 136 of the storage memory 109. Data may be considered to be folded into the target block 136 when the data is moved from one or more source blocks 138 elsewhere in the storage memory 109 to the target block 136. During a folding 140, the folding module 120 may move the data from the source blocks 138 to the target block 136. The source blocks 138 may be in the first solid state memory 110 and the target block 136 may be in the second solid state memory 112. For example, the one or more blocks 138 of the first solid state memory 110 may include single-level cell flash memory and the block 136 of the second solid state memory may include multi-level cell flash memory, so the folding 140 may increase availability of single-level cell flash memory.

The EPWR module 122 may be any component that performs an enhanced post write read (EPWR). The EPWR may be any operation that reads data from the storage memory 109 after the data was written to the storage memory 109 in order to verify that the data was correctly written to the storage memory 109. The EPWR may include one or more additional operations in some examples. In a first example, the EPWR may include an operation to determine when to perform the post write read based on one or more conditions, such as whether a number of program-erase cycles exceeds a threshold value. In a second example, the EPWR may include a determination of which pages of the storage memory 109 to read because not all pages of the storage memory 109 may necessarily be read. The data is correctly written to the storage memory 109 when the data read from the storage memory matches the data written to the storage memory 109.

The EPWR scheduler 124 may be any component that determines whether the EPWR is to be performed in response to the folding 140. As described in more detail below, the EPWR scheduler 124 may determine whether the EPWR is to be performed on the target block 136 based on a determined error rate of the target block 136.

During operation of the adaptive EPWR system 100, the EPWR scheduler 124 may determine when the EPWR module 122 performs the EPWR based on the determined error rate, such as a fail bit count (FBC). The EPWR scheduler 124 may determine that the EPWR is to be performed on the target block 136 of the solid state memory 109 in response to the folding 140 of the data into the target block 136 more frequently when the determined error rate of the target block 136 is above a threshold than when the determined error rate is below the threshold. For example, in response to the folding module 120 folding the data into the target block 136, the EPWR scheduler 124 may cause the EPWR module 122 to perform the EPWR on the target block 136 when data has been folded into the target block 136 a determined number of times since a previous EPWR was performed on the target block 136, but not when data has been folded into the target block 136 less than the determined number of times since the previous EPWR was performed, where the determined number of times is based on the determined error rate of the target block 136.

Table 1 below illustrates an example of how the determined number of times since the previous EPWR was performed may be based on the determined error rate. Table 1 provides a mapping of ranges of determined error rates of the target block 136, such as ranges of fail bit counts (FBCs), to corresponding grades and, ultimately, to corresponding grade counts. The grade may be an indication of the quality of the target block 136. For example, a grade of "A" may indicate the best quality and a grade of "E" may indicate the worst quality. The grade count may indicate the number of times that data may be folded into the target block 136 without performing the EPWR. In other words, the grade count may indicate the number of times that data may be folded into the target block 136 between two sequential EPWRs.

TABLE 1

| FBC | Grade | Grade Count |
|-----|-------|-------------|
| 0-20 | A | 5 |
| 21-40 | B | 4 |
| 41-50 | C | 3 |
| 51-60 | D | 2 |
| 61-70 | E | 1 |

The EPWR scheduler 124 may look up the determined error rate in a mapping table like Table 1 to find the grade and/or the grade count for the target block 136. For example, if the FBC is 25 for the target block 136, then the corresponding grade in the table is "B" and the corresponding grade count in the table is four. In another example, if the FBC is 20, then the corresponding grade is "A" and the corresponding grade count is five.

Any other type of mapping may be used to determine the grade count from the determined error rate. For example, any mathematical map may be used map the error rate onto the grade count. For example a linear function, an exponential function, or any other mathematical function may calculate the grade count given the determined error rate.

The EPWR scheduler 124 may determine a folding count, which may represent a number of times that data was folded into the target block 136 of the storage memory 109 since a previous enhanced post write read was performed on the block 136. Because the EPWR scheduler 124 may not have caused an EPWR to be performed on the block 136 each time data was folded into the block 136, the folding count may be greater than one.

The EPWR scheduler 124 may determine whether the folding count is equal to or greater than the grade count. If so, then the EPWR scheduler 124 may determine that the EPWR module 122 is to perform another EPWR in response to the folding 140. Alternatively, if the folding count is less than the grade count, then the EPWR scheduler 124 may determine that the EPWR module 122 is not to perform the EPWR yet.

Figure 2:
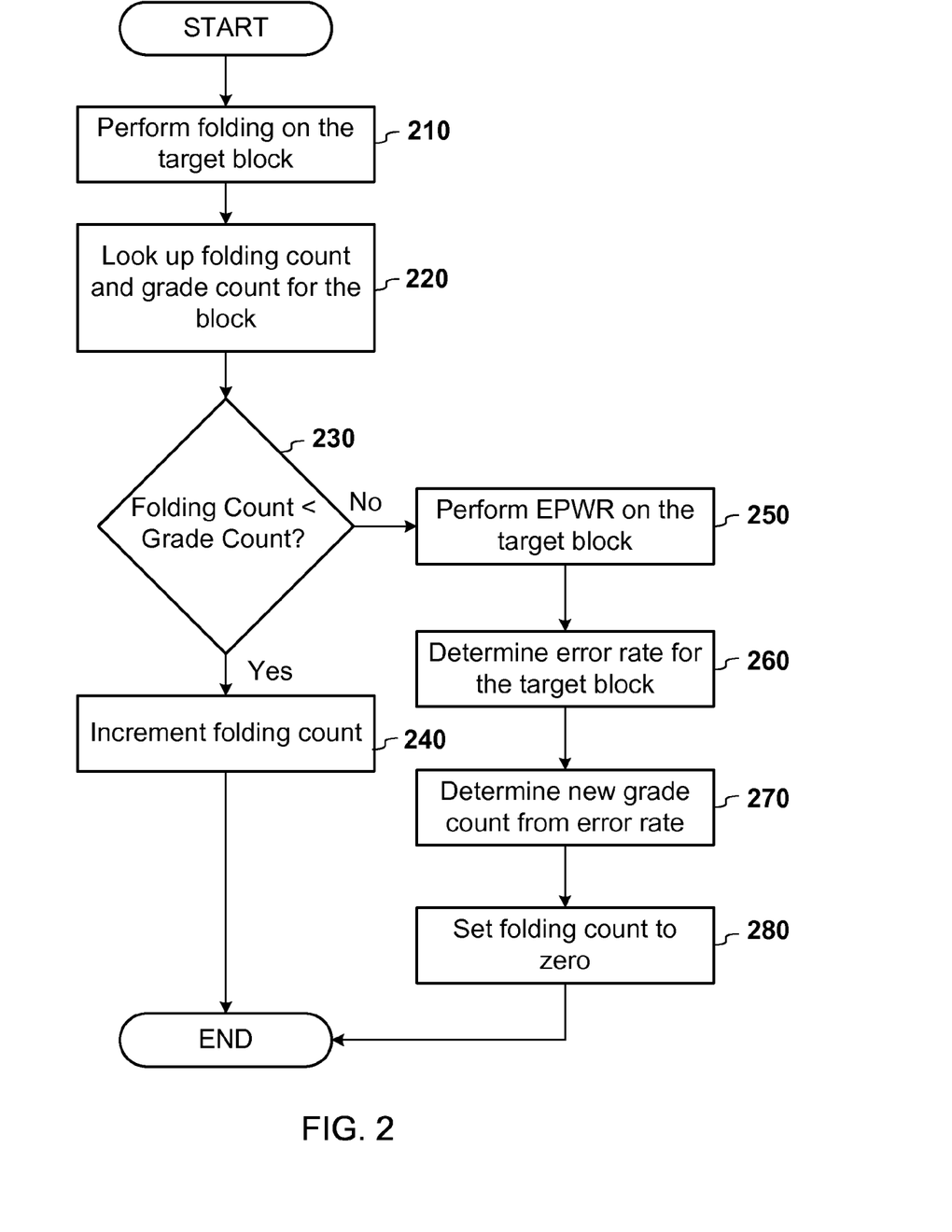
FIG. 2 illustrates a flow diagram of a first example logic of an adaptive EPWR system.

FIG. 2 provides more details regarding operations performed by the adaptive EPWR system 100. In particular, FIG. 2 illustrates a flow diagram of example logic of the adaptive EPWR system 100. The logic may include additional, different, or fewer operations than illustrated.

The operations may begin with the folding module 120 performing (210) the folding 140 on the target block 136. In response to the folding 140, the EPWR scheduler 124 may look up (220) the folding count and the grade count for the target block 136 in the block characterization data 118. For example, the folding count and the grade count may be in the folding counts 134 and the grade counts 134, respectively.

The EPWR scheduler 124 may determine (230) whether the folding count is less than the grade count for the target block 136. If the folding count is less than the grade count, then the EPWR scheduler 124 may increment (240) the folding count for the target block 136 without causing the EPWR module 122 to perform the EPWR. The EPWR scheduler 124 may update the folding counts 134 in the block characterization data 118 to reflect the incremented folding count for the target block 136. Operations may end by, for example, waiting until the folding module 120 performs (210) another folding on the target block 136.

Alternatively, if the folding count is not less than the grade count or otherwise matches the grade count, then the EPWR scheduler 124 may cause (250) the EPWR module 122 to perform the EPWR on the target block 136. The EPWR module 122 or the EPWR scheduler 124 may then determine (260) a new error rate for the target block 136. For example, the new error rate may be the FBC derived from a comparison of the data written to the target block 136 with data that is read from the target block 136 during the EPWR. The EPWR module 122 or the EPWR scheduler 124 may update the error rates 126 in the block characterization data 118 to reflect the new determined error rate for the target block 136.

The EPWR scheduler 124 may determine (270) a new grade count from the new determined error rate. For example, the new determined error rate may be mapped to the new grade count as described above. The EPWR scheduler 124 may update the grade counts 132 in the block characterization data 118 to reflect the new grade count for the target block 136.

The EPWR scheduler 124 may set (280) the folding count to zero or otherwise reset the folding count for the target block 136. The EPWR scheduler 124 may update the folding counts 134 in the block characterization data 118 to reflect the reset folding count for the target block 136.

Operations may end by, for example, waiting until the folding module 120 performs (210) another folding on the target block 136. Operations may then proceed with the remaining operations described above, starting with looking up (220) the folding count and the grade count.

As described above, the determined error rate may be a fail bit count (FBC). The fail bit count may be the number of bits that differ between the data read from the target block 136 and the data written to the target block 136. More generally, the determined error rate may be any indication of how much of the target block 136 failed to retain data stored in the target block 136. Alternatively or in addition, the determined error rate may be any indication of a portion of the target block 136 that failed to retain data stored in the target block 136. For example, the determined error rate may be a percentage, a fraction, a number of pages, a number of bytes, a number of bits, or any other indication of the portion of the target block 136 that failed to retain data stored in the target block 136.

Figure 3:
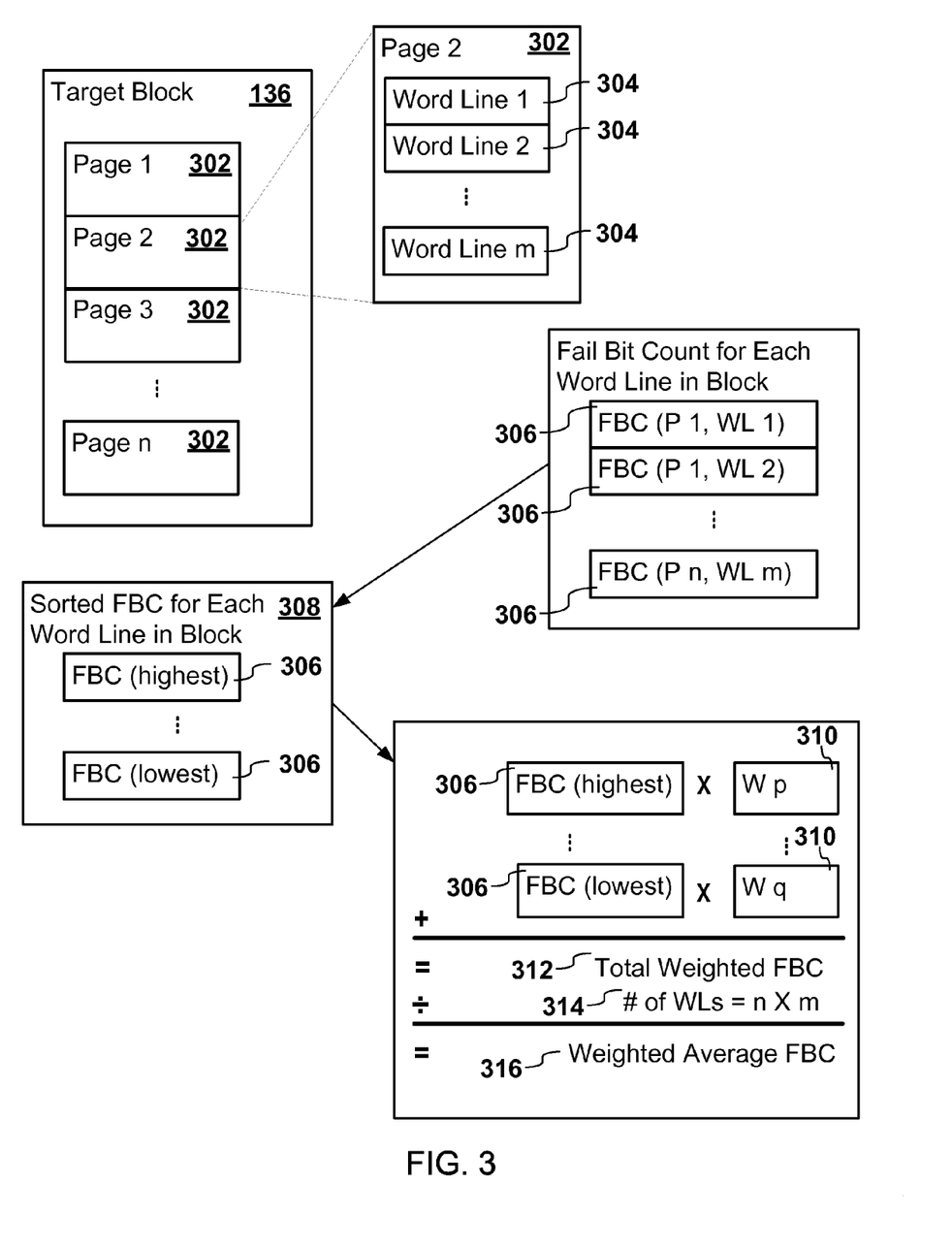
FIG. 3 illustrates a determination of a weighted average fail bit count of a target block.

FIG. 3 illustrates a determination of a weighted average fail bit count 316 of the target block 136. The target block 136 may comprise multiple pages 302. Each of the pages 302 may be individually read and/or written by the storage controller 108. Each of the pages 302 may include multiple word lines 304. Each of the word lines 304 may include multiple bits (not shown) in a word of storage data.

The EPWR scheduler 124 may determine a fail bit count 306 for each word line 304 in the target block 136. The FBC 306 may be indexed, for example, by a page number and a word number, such as FBC(p, wl), where p identifies the page 302 and wl identifies the word line 304 within page p.

The EPWR scheduler 124 may prepare a sorted list 308 of the fail bit counts 306 for the word lines 304 in the target block 136, where the sorted list 308 is sorted by the fail bit counts 306. Each of the fail bit counts 306 may be multiplied by a corresponding weight factor 310 to yield a corresponding weighted fail bit count. The size of the weight factor 310 may vary depending on the position of the corresponding fail bit count 306 in the sorted list 308 of the fail bit counts 306. For example, the weight factor 310 for the highest 25 percent of the fail bit counts 306 in the sorted list 308 may be $W_1$; the weight factor 310 for the second highest 25 percent of the fail bit counts 306 may be W₂; the weight factor 310 for the second lowest 25 percent of the fail bit counts 306 may be W₃; and the weight factor 310 for the lowest 25 percent of the fail bit counts 306 may be W₄. The weight factors 310 W₁ to W₄ may range from a highest weight to a lowest weight, respectively.

The EPWR scheduler 124 may sum the weighted fail bit counts to obtain a total weighted FBC 312. The total weighted FBC 312 may be divided by a number 314 of word lines in the target block 136 to obtain the weighted average fail bit count 316. The number 314 of word lines in the target block 136 may be a total number of pages in the target block 136 multiplied by a total number of word lines in each page.

As indicated above, the size of the weight factor 310 may vary depending on the position of the corresponding fail bit count 306 in the sorted list 308 of the fail bit counts 306. Alternatively or in addition, the EPWR scheduler 124 may only use a subset of the fail bit counts 306 in the determination of the weighted average fail bit count 316. For example, each of the highest 25 percent of the fail bit counts 306 in the sorted list 308 may be multiplied by a corresponding one of the weight factors 310, and the remaining 75 percent of the fail bit counts 306 may be ignored. For example, the EPWR scheduler 134 may determine the weighted average FBC 316 to be $$(F_n*25+F_{n-1}*24+F_{n-2}*23++F_1*1)/(25+24+\ldots+1)$$

where the number 314 of word lines in the target block 136 is 100, where $F_n$ is the highest one of the fail bit counts 306, the corresponding weight factor 310 for $F_n$ is 25, $F_{n-1}$ is the second highest one of the fail bit counts 306, the corresponding weight factor 310 for $F_{n-1}$ is 24, ..., $F_1$ is the 25$^{th}$ highest one of the fail bit counts 306, and the corresponding weight factor 310 for $F_1$ is 25.

By focusing on the highest of the fail bit counts 306, the EPWR scheduler 124 may cause the EPWR to be performed when failures are present. By including multiple fail bit counts 306 in the calculation of the weighted fail bit count 316, the EPWR scheduler 124 may be less likely to cause the EPWR to be performed when the highest one of the fail bit counts 306 is an outlier.

Figure 4:
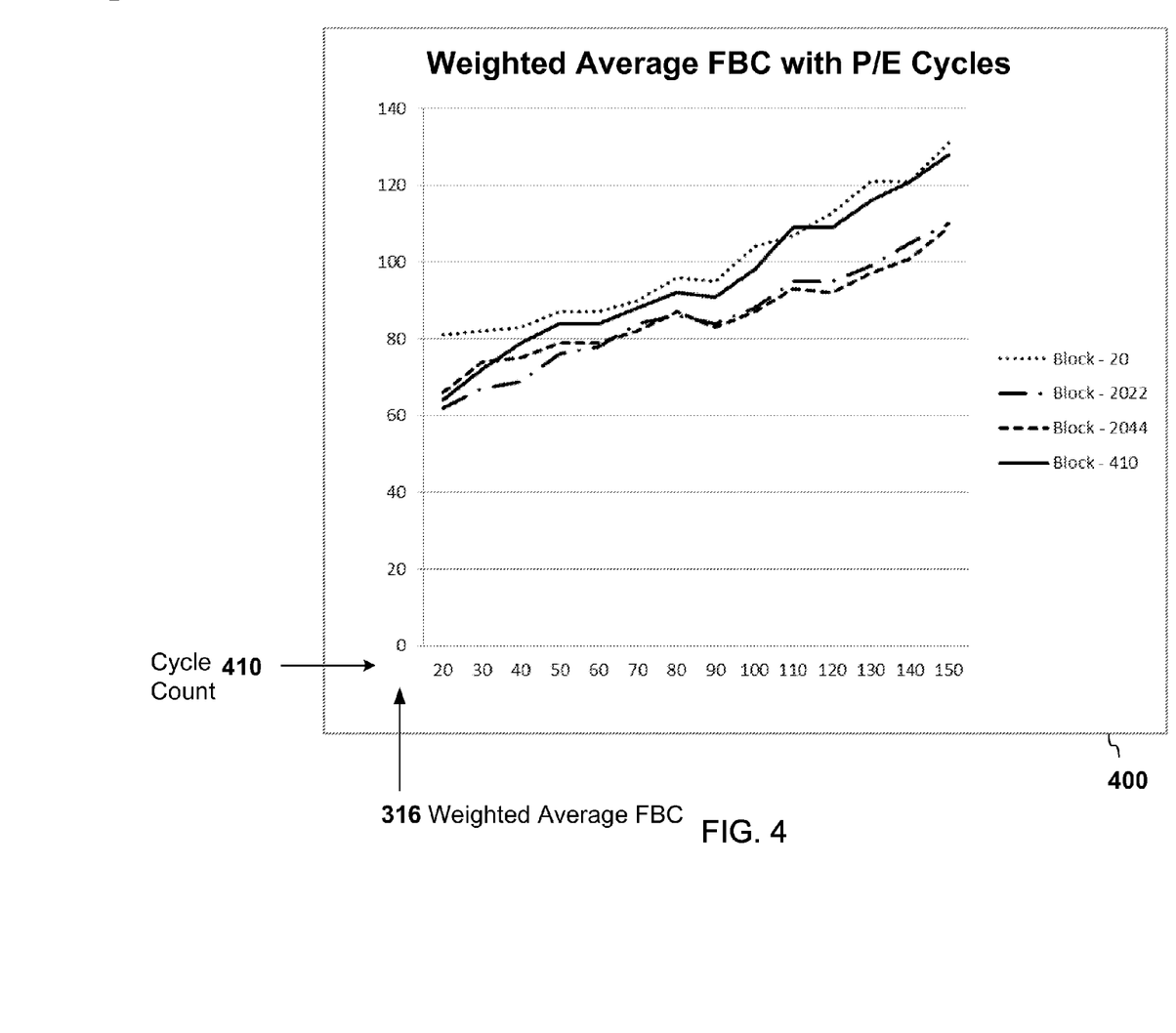
FIG. 4 illustrates a graph of how a weighted average fail bit count of multiple blocks vary as a cycle count for each of the blocks increases.

FIG. 4 illustrates a graph 400 of how the weighted average FBC 316 of multiple blocks 114 (individually designated Block 20, Block 2022, Block 2044, and Block 410) vary as a cycle count 410 (number of program-erase cycles) for each of the blocks 114 increases. The graph 400 indicates that for any given cycle count 410, the weighted average FBC 316 varies by the block 114. Accordingly, the weighted average FBC 316 or other type of determined error rate of the target block 136 may be a better indication of the quality of the target block 136 than the cycle count 410. The cycle count 410 or hot count may be the number of times that the block 114 was erased.

As described above, data may be considered to be folded into the target block 136 when the data is moved from the source block or blocks 138 in the storage memory 109 to the target block 136. Alternatively or in addition, data may be considered to be folded into the target block 136 when the data is simply copied from one or more source blocks 138 to the target block 136. If the folding module 120 moves the data to the target block 136 instead of merely copying the data, then the folding module 120 may update the logical-to-physical map 116 to indicate that the data in one or more logical blocks is now located in the target block 136. The folding module 120 may perform the folding 140 in response to a garbage collecting event, a wear leveling event, or any other type of event in which data is copied and/or moved to the target block 136.

The adaptive EPWR system 100 may be implemented with additional, different, or fewer components than illustrated in FIG. 1. For example, the system 100 may not include the processor 104, and the storage controller 108 may operate as a processor.

The processor 104 may be in communication with the memory 106 and the storage interface 102. The processor 104 may be a microprocessor, a microcontroller, a controller, a general processor, a central processing unit, an application specific integrated circuit (ASIC), digital signal processor, field programmable gate array (FPGA), digital circuit, analog circuit, or combinations thereof.

The processor 104 may be one or more devices operable to execute logic. The logic may include computer executable instructions or computer code embodied in the memory 106 or in other memory that when executed by the processor 104, cause the processor 104 to perform the features of modules such as the folding module 120, the EPWR module 122, and/or the EPWR scheduler 124. Alternatively or in addition, the storage controller 108 may be operable to execute computer executable instructions or computer code embodied in the memory 106 or other memory. The computer executable instructions or computer code, when executed by the storage controller 108, may cause the storage controller 108 to perform the features of modules such as the folding module 120, the EPWR module 122, and/or the EPWR scheduler 124.

Each component may include additional, different, or fewer components. For example, the storage memory 109 may include one solid state memory instead of the first solid state memory 110 and the second solid state memory 112. In another example, the storage memory 109 may include more than two solid state memories. In still another example, the block characterization data 118, the logical-to-physical map 116, and/or the modules 120, 122, and 124, may be included in the storage memory 109 or in some memory other than the memory 106 illustrated in FIG. 1. In still another example, the EPWR scheduler 124 may include a grader module, a storage module, and a scheduler module. The grader module may determine the grade counts 132 and/or the grades 130. The storage module may read and write the block characterization data 118. The scheduler module may determine whether to perform the EPWR in response to the folding 140.

The target block 136 illustrated in FIG. 3 includes multiple pages 302. However, in other examples, the target block 136 may include units of a different type, such as bytes or words. In general, each of the blocks 114 may be any unit of storage that forms the storage memory 109.

The EPWR scheduler 124 may determine when to cause the EPWR module 122 to perform the EPWR based on factors in addition to the determined error rate. For example, no EPWRs may be performed on the target block 136 until the cycle count or hot count of the target block 136 reaches a threshold level. After the cycle count of the target block 136 reaches the threshold level, the EPWR scheduler 124 may determine when to perform the EPWR based on the determined error rate of the target block 136. Alternatively or in addition, if the determined error rate and/or the cycle count of the target block 136 exceeds an upper threshold value, then the block may no longer be unused in some implementations.

The system 100 may be implemented in many different ways. Each module, such as the folding module 120, the EPWR module 122, and/or the EPWR scheduler 124, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 106, for example, that comprises instructions executable with the processor 104, the storage controller 108, or other processor to implement one or more of the features of the module. When any one of the modules includes the portion of the memory that comprises instructions executable with a processor, the module may or may not include the processor. In some examples, each module may just be the portion of the memory 106 or other physical memory that comprises instructions executable with the processor 104, the storage controller 108, or other processor to implement the features of the corresponding module without the module including any other hardware. Because each module includes at least some hardware even when the included hardware comprises software, each module may be interchangeably referred to as a hardware module, such as the folding hardware module 120, the EPWR hardware module 122, and the EPWR scheduler hardware module 124.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, or RAM. The computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

Figure 5:
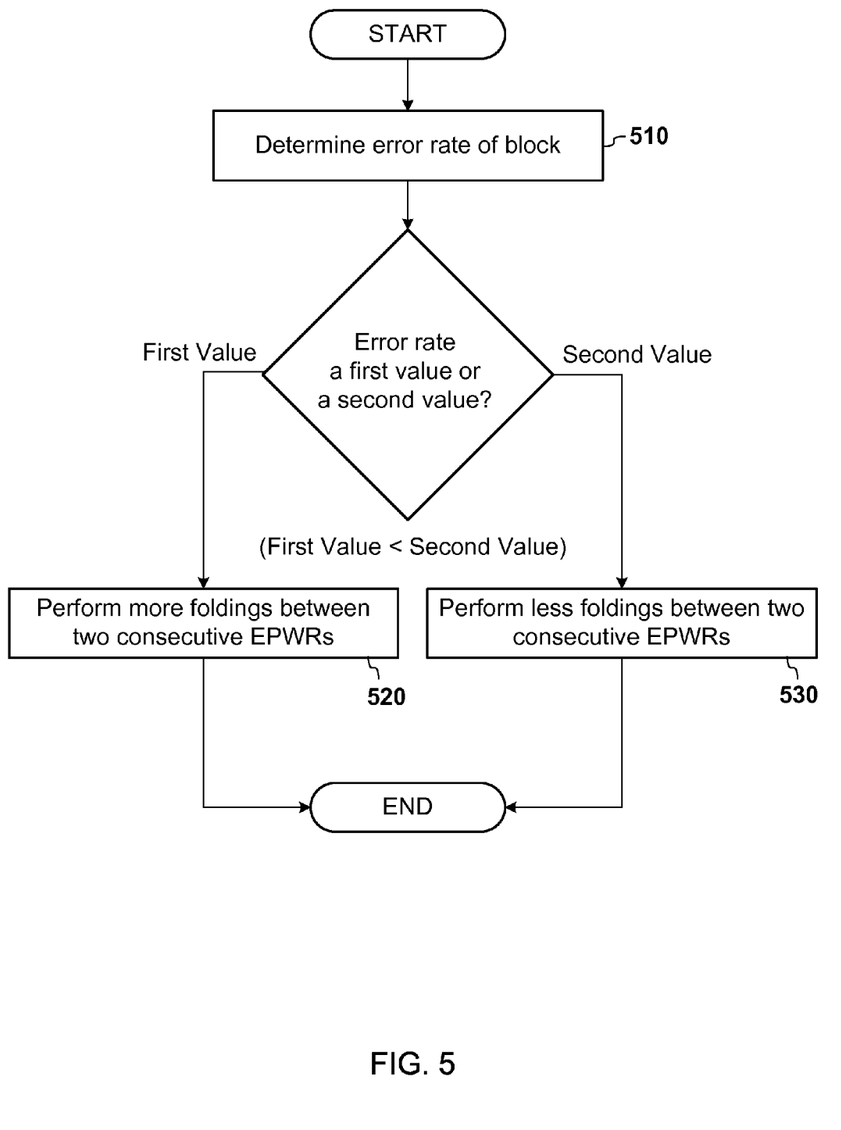
FIG. 5 illustrates a flow diagram of a second example logic of an adaptive EPWR system.

FIG. 5 illustrates a flow diagram of a second example of logic of the adaptive EPWR system 100. The logic may include additional, different, or fewer operations than illustrated in FIG. 5. The operations may be executed in a different order than illustrated in FIG. 5.

The error rate of the target block 136 of the solid state memory 110 or 112 may be determined (510). The determined error rate may be a first value, a second value, or some other value, where the first value is less than the second value, or the contrapositive: the second value is greater than the first value.

Foldings 140 may be performed more times between two consecutive enhanced post write reads on the target block 136 when the determined error rate of the target block 136 is a first value (520) than when the determined error rate is a second value (530). See Table 1 above, for examples of multiple possible values of the determined error rates and the corresponding grade counts 132.

The operations may end by, for example, with a determination of a new error rate from the second of the two consecutive EPWRs.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Furthermore, although specific components are described above, methods, systems, and articles of manufacture consistent with the innovation may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. An adaptive enhanced post write read (EPWR) system, comprising:
   a solid state memory;
   a folding module configured to fold data into a block of the solid state memory;
   an enhanced post write read module configured to perform enhanced post write reads including a first enhanced post write read on the block and a second enhanced post write read on the block; and
   an enhanced post write read scheduler configured to cause the enhanced post write read module to perform the second enhanced post write read on the block in response to a determination that folded data was folded into the block a determined number of times since the first enhanced post write read was performed on the block, wherein the determined number of times is based on a determined error rate of the block.

2. The system of claim 1, wherein the determined error rate of the block is determined from the first enhanced post write read.

3. The system of claim 1, wherein the determined error rate of the block is based on a fail bit count of the block.

4. The system of claim 3, wherein the fail bit count is a weighted average fail bit count of the block.

5. The system of claim 1, wherein the enhanced post write read scheduler is further configured to determine a grade count that indicates a number of times that any data is to be folded into the block between two sequential enhanced post write reads, wherein the grade count is based on the determined error rate of the block, and the grade count matches the determined number of times since the first enhanced post write read was performed on the block.

6. The system of claim 5, wherein the enhanced post write read scheduler is further configured to determine the grade count from a mapping of determined error rates to grade counts.

7. The system of claim 1, wherein the folding module is configured to fold the data from a plurality of source blocks of the solid state memory into the block of the solid state memory.

8. A non-transitory computer readable storage medium comprising computer executable instructions, the computer executable instructions executable by a processor, the computer executable instructions comprising:
   instructions executable to perform enhanced post write reads including a first enhanced post write read on a block of solid state memory and a second enhanced post write read on the block of solid state memory; and
   instructions executable to cause the second enhanced post write read to be performed on the block in response to a determination that data was folded into the block a determined number of times since the first enhanced post write read was performed on the block, wherein the determined number of times is based on a determined error rate of the block.

9. The computer readable storage medium of claim 8 further comprising instructions executable to determine, based on the determined error rate of the block, a grade count that indicates a determined number of times that folded data is to be folded into the block after the first enhanced post write read is performed, wherein the grade count matches the determined number of times since the first enhanced post write read was performed on the block.

10. The computer readable storage medium of claim 8 further comprising instructions executable to determine the determined error rate of the block.

11. The computer readable storage medium of claim 8 further comprising instructions executable to determine the determined error rate of the block as a weighted average of fail bit counts of a plurality of pages of the block.

12. The computer readable storage medium of claim 11, wherein fail bit counts in a first set of the fail bit counts of the pages are higher than fail bit counts in a second set of the fail bit counts of the pages, and the fail bit counts in the first set of the fail bit counts are weighted more than the fail bit counts in the second set of the fail bit counts in a determination of the weighted average of the fail bit counts of the pages of the block.

13. The computer readable storage medium of claim 11, wherein the determined error rate of the block includes a fail bit rate count of the block, the fail bit rate count of the block indicative of a number of bits that differ between the data read from the block and the data written to the block.

14. The computer readable storage medium of claim 11, wherein the determined error rate of the block includes an indication of a portion of the block failed to retain the data stored in the block.

15. A method for adaptive enhanced post write reads (EPWRs), the method comprising:
   determining an error rate of a block of a solid state memory; and
   performing foldings more times between two consecutive enhanced post write reads on the block when the determined error rate of the block is a first value when the determined error rate is a second value, wherein the second value is higher than the first value, and wherein performing the foldings comprises folding data into the block of the solid state memory.

16. The method of claim 15 further comprising determining a grade count for the block based on the determined error rate of the block, the grade count indicating a number of times that any data is to be folded into the block after a first enhanced post write read is performed on the block before a second enhanced post write read is performed on the block.

17. The method of claim 16, wherein determining the grade count comprises mapping the determined error rate to the grade count.

18. The method of claim 17, wherein mapping the determined error rate comprises identifying the grade count that corresponds to a range of error rates in a map, the range of error rates including the determined error rate of the block.

19. The method of claim 16 further comprising:
   performing the first enhanced post write read;
   determining a number of times that folded data was folded into the block since the first enhanced post write read was performed on the block; and
   performing the second enhanced post write read in response to a determination that the grade count is equal to the number of times that the folded data was folded into the block since the first enhanced post write read was performed on the block.

20. The method of claim 15, wherein the solid state memory comprises a solid state memory of a first type and a solid state memory of a second type, and wherein performing the foldings comprises moving the data from the solid state memory of the first type to the solid state memory of the second type, the second type having a higher density than the first type.

* * * * *